Figure 1:
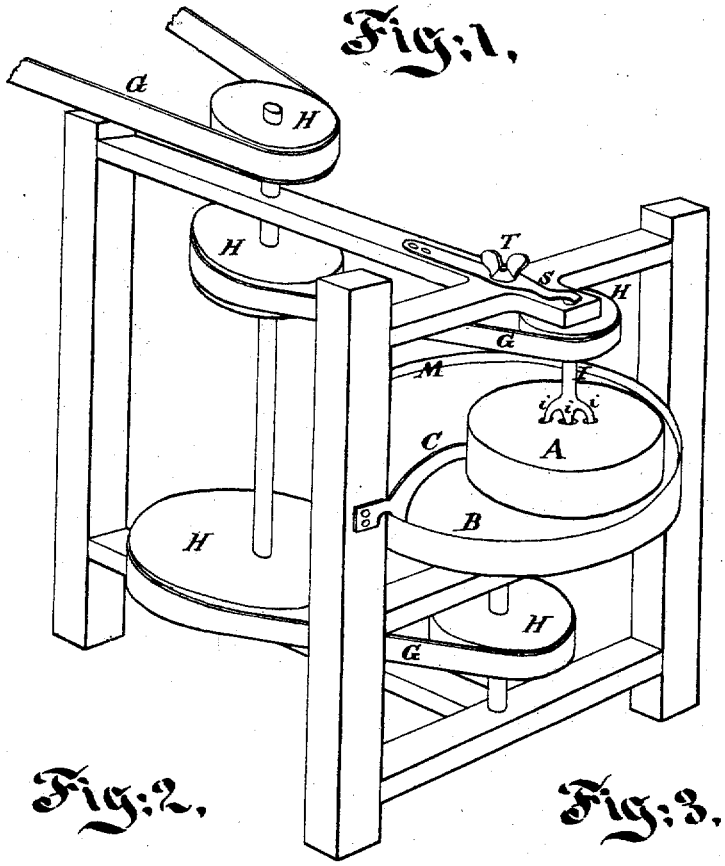

C. BELCHER.

Improvement in Paint Mills.

No. 4,807. Reissued March 19, 1872.

Witnesses:

Wm. C. Dey

Arnold Hornemann.

Inventor:

Charles Belcher by his attorney F. S. Stetson

AM. PHOTO-LITHOGRAPHIC CO. N.Y. (OSBORNE'S PROCESS.)

UNITED STATES PATENT OFFICE.

CHARLES BELCHER, OF NEWARK, NEW JERSEY.

IMPROVEMENT IN PAINT-MILLS.

Specification forming part of Letters Patent No. 76,386, dated April 7, 1868; reissue No. 4,807, dated March 19, 1872.

*To all whom it may concern:*

Be it known that I, CHARLES BELCHER, of the city of Newark, Essex county, State of New Jersey, have made certain Improvements in Mills for Fine Grinding of Colors, Enamels, and other articles; and I do hereby declare the following to be a full and exact description of the same, reference being had to the drawing that accompanies this specification and which is made part of the same.

Figure 2:
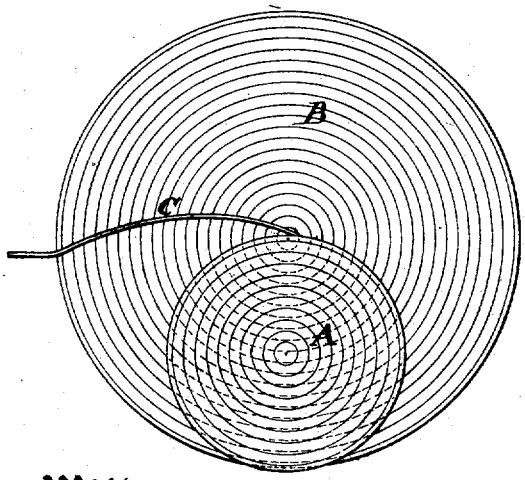

Figure 1 is a perspective view, showing the mill entire. Fig. 2 is a plan view or diagram, showing the relations of the motions. The additional figure is a diagram illustrating the relative movements of friction at different points.

Similar letters of reference indicate like parts in both the figures.

It has been a great desideratum, not heretofore perfectly attained, to have a mill so constructed that the grinding-surfaces should preserve a true face unaltered by the wear of its work. The need of a quickly-produced uniformity of fineness in the material subjected to the grinding process, and of preventing the waste of the very costly material requiring fine grinding for use in some of the arts, has not been fully met by any of the many good mills in common use.

The improvement made will appear to be but slight, although its effects are of great importance. It consists: First, in so arranging or adapting two grinding-surfaces that the tendency of their wear shall be to produce and preserve true surfaces—plain surfaces when such are commenced with—as near to perfection as possible. Second, the combination therewith of a scraper adapted to aid in confining the colors, or other material being ground, to the grinding parts. Third, the combination therewith of a spring-pressure, with means for delicately adjusting at will, to force the grinding-surfaces together. Fourth, the entire combination and arrangement of all the parts, whereby is induced a uniformity in fineness in the material under process of disintegration, with less waste of stock than otherwise is attainable, much time being saved not only in grinding, but also in avoiding the correcting of the grinding-surfaces required in the use of other mills.

These important results are attained by having two grinders, A and B, (in the drawing,) A being about half the diameter of B, both revolving, motion being given by pulleys H and belts G from a single driving-shaft, A being made to cover the entire space between the center and the circumference of the larger grinder B. The grinding-surfaces are both driven in the same direction with about the same number of revolutions per minute, as indicated by the pulleys and belts in Fig. 1. These conditions cause every portion of the entire surface of A to give the same amount of friction to every portion of the face of B, rendering any inequality from wear nearly or quite impossible. By means of the guide or scraper C, and the upward-projecting rim M, the material is confined to the grinding parts and place. A spring, S, is placed over the top of the driving-shaft I of the grinder A, and, controlled by means of the thumb-screw T, regulates the pressure of the grinder A upon the material under process of grinding. The driving-shaft I is not fast to the grinder A, but is loose, and takes hold of it by the arms *i*, fitting loosely in holes, as represented, so as to allow of perfect uniform contact of the faces of the grinders under all conditions.

This mill is especially adapted for the finer kind of material used in the fine arts; but it is not confined to such use, or to any particular kind of grinding-surfaces. Stone, porcelain, glass, or metal can be employed with the same results of uniform wear of the entire grinding-surfaces.

Figure 3:
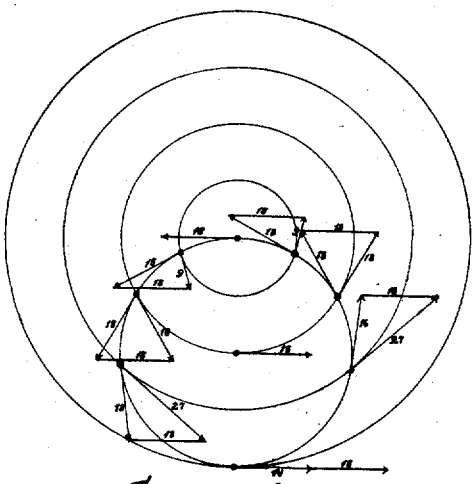

Referring to the illustrative diagram, Fig. 3, and having in view the fact that both grinders turn with the same angular velocity—or, in other words, perform the same number of revolutions per minute—and in the same direction, supposing the periphery of the lower stone to move with a velocity of 36 inches per second, (or with any other unit of motion indicated by 36,) the periphery of the smaller grinder A will, by virtue of the smaller radius, move with half that velocity; and at the point where their peripheries are in contact, the motion of the lowermost relatively to the uppermost will be 36—18=18. A careful study of the conditions obtaining at any other of the points in contact will give exactly the same relative motions. Take, for example, the point where the periphery of the upper stone A passes over or adjacent to the center of the lower stone B. Here the point in the lower stone is stationary, and the upper stone moving with the speed of 18 gives the same velocity as before—18. Take the point where the center of the upper stone A, which is at rest, is acted against by the adjacent surface of the lower stone B, which, by virtue of its being half-way between the center and the circumference, has half the motion of the circumference—$\frac{36}{2}$=18. The same will be true of the more abstruse analyses required for any of the other points. I will consider but two. These are the points where the periphery of the upper stone A moves outward and inward across a line half-way between the center and circumference of the lower stone B. Here there may at first seem to be an increased action, because both surfaces are moving, the upper surface with a speed of 18 across the lower surface, which has also a speed of 18; but the motions are not opposed to each other, nor again directly across each other at right angles, but their motions partially coinciding they cross each other at an angle of sixty degrees; and when, by a proper method of analysis of such motions, which I have endeavored to indicate by the two arrows, the resultant motion is ascertained, it is found to be as before—18. The diagram shows the same method of investigation applied to some of the intermediate points. In each, one arrow, in the tangent of motion of the particles of one stone, has a length proportionate to its velocity, and the other arrow, in the tangent of the motion of the particles of the other stone, which rub at that moment thereon, has a length proportionate to its velocity. The stronger lines, joining the ends of these arrows, show the amount of the motion of one relatively to the adjacent portion of the other. In all the points they are equal.

What I claim as my invention, and desire to secure by Letters Patent, is—

1. The grinding-surfaces A and B, having the within-described relative proportions and motions, the grinder A being about one-half the diameter of the grinder B, and operating eccentrically thereon, in the manner substantially as specified, so that all points in either stone shall be equally worn, and the surfaces kept constantly true by the wear, as specified.

2. The scraper C and grinders A and B, constructed, arranged, and operating relatively to each other, as above described, for the purposes set forth.

3. The pressing-spring S and adjusting means T, in combination with grinders A and B, one about half the size of the other, both revolving over equal angles in equal times, as specified.

4. The loosely-mounted shaft I *i*, and adjustable pressing means S T, the small muller or grinder A driven thereby, arranged and operated, as shown, relatively to each other and to the large grinder or slab B, scraper C, and rim M, for the purposes specified.

In testimony whereof I have hereunto set my hand this 16th day of February, 1872, in the presence of two subscribing witnesses.

CHARLES BELCHER.

Witnesses:
WM. C. DEY,
ARNOLD HORMANN.